United States Patent
Kaku et al.

(10) Patent No.: US 10,805,109 B2
(45) Date of Patent: Oct. 13, 2020

(54) RELAY APPARATUS FOR RECORDING A DATA ITEM INDICATING A DEVICE HAVING A LOWEST FREQUENCY OF COMMUNICATION

(71) Applicant: DENSO CORPORATION, Kariya, Aichi-pref. (JP)

(72) Inventors: Yoshifumi Kaku, Kariya (JP); Shinya Ishibashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/515,369

(22) Filed: Jul. 18, 2019

(65) Prior Publication Data
US 2020/0076644 A1 Mar. 5, 2020

(30) Foreign Application Priority Data
Aug. 29, 2018 (JP) ................................. 2018-160520

(51) Int. Cl.
*H04L 12/721* (2013.01)
*H04L 12/46* (2006.01)
*H04L 29/12* (2006.01)

(52) U.S. Cl.
CPC .... *H04L 12/4625* (2013.01); *H04L 29/12839* (2013.01); *H04L 45/36* (2013.01)

(58) Field of Classification Search
None
See application file for complete search history.

(56) References Cited

U.S. PATENT DOCUMENTS

2012/0177055 A1* 7/2012 Kobatake ................ H04L 45/36
370/401

FOREIGN PATENT DOCUMENTS

JP 2012-235400 A 11/2012

* cited by examiner

*Primary Examiner* — Ayanah S George
(74) *Attorney, Agent, or Firm* — Posz Law Group, PLC (57) ABSTRACT

A relay apparatus is provided to specify, in a plurality of recording areas in an information table, a target recording area being a recording area which records a transmission source data-item included in a frame and indicating as transmission source a device having a lowest frequency of communication via the relay apparatus, in response to receiving an unrecorded frame via a port of a plurality of ports under a fully recorded state of the plurality of recording areas. The unrecorded frame is a frame including a transmission source data-item that is not recorded in any of the plurality of recording areas. The fully recorded state of the plurality of recording areas is a state where the transmission source data-item and the port data-item are recorded fully in each of all the plurality of recording areas included in the information table.

6 Claims, 6 Drawing Sheets

RELAY APPARATUS FOR RECORDING A DATA ITEM INDICATING A DEVICE HAVING A LOWEST FREQUENCY OF COMMUNICATION

CROSS REFERENCE RELATED APPLICATION

The present application claims the benefit of priority from Japanese Patent Application No. 2018-160520 filed on Aug. 29, 2018. The entire disclosure of the above application is incorporated herein by reference.

TECHNICAL FIELD

The present disclosure relates to a relay apparatus included in a communication network.

BACKGROUND

For example, a switch as a relay apparatus in Ethernet has a MAC address learning function. Ethernet is a registered trademark. The MAC address learning function is a function that stores or records, in the MAC address table, (i) the transmission source MAC address in a frame received via any one of a plurality of ports in a switch and (ii) the port number of the port via which the frame is received, such that the transmission source MAC address is associated with the port number. Hereinafter, in the MAC address table, a portion or an area which records a single set including (i) the transmission source MAC address and (ii) the port number is called an entry.

When a frame is received via any one of a plurality of ports, a transfer destination port via which the received frame is transmitted is determined from the transmission destination MAC address in the received frame and the recorded contents in the MAC address table.

SUMMARY

According to an embodiment of the present disclosure, a relay apparatus is provided to specify, in a plurality of recording areas in an information table, a target recording area being a recording area which records a transmission source data-item included in a frame and indicating as transmission source a device having a lowest frequency of communication via the relay apparatus, in response to receiving an unrecorded frame via a port of a plurality of ports under a fully recorded state of the plurality of recording areas. The unrecorded frame is a frame including a transmission source data-item that is not recorded in any of the plurality of recording areas. The fully recorded state of the plurality of recording areas is a state where the transmission source data-item and the port data-item are recorded fully in each of all the plurality of recording areas included in the information table.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Hereinafter, embodiments of the present disclosure will be described with reference to the drawings.

1. First Embodiment

1-1. Configuration

Figure 1:
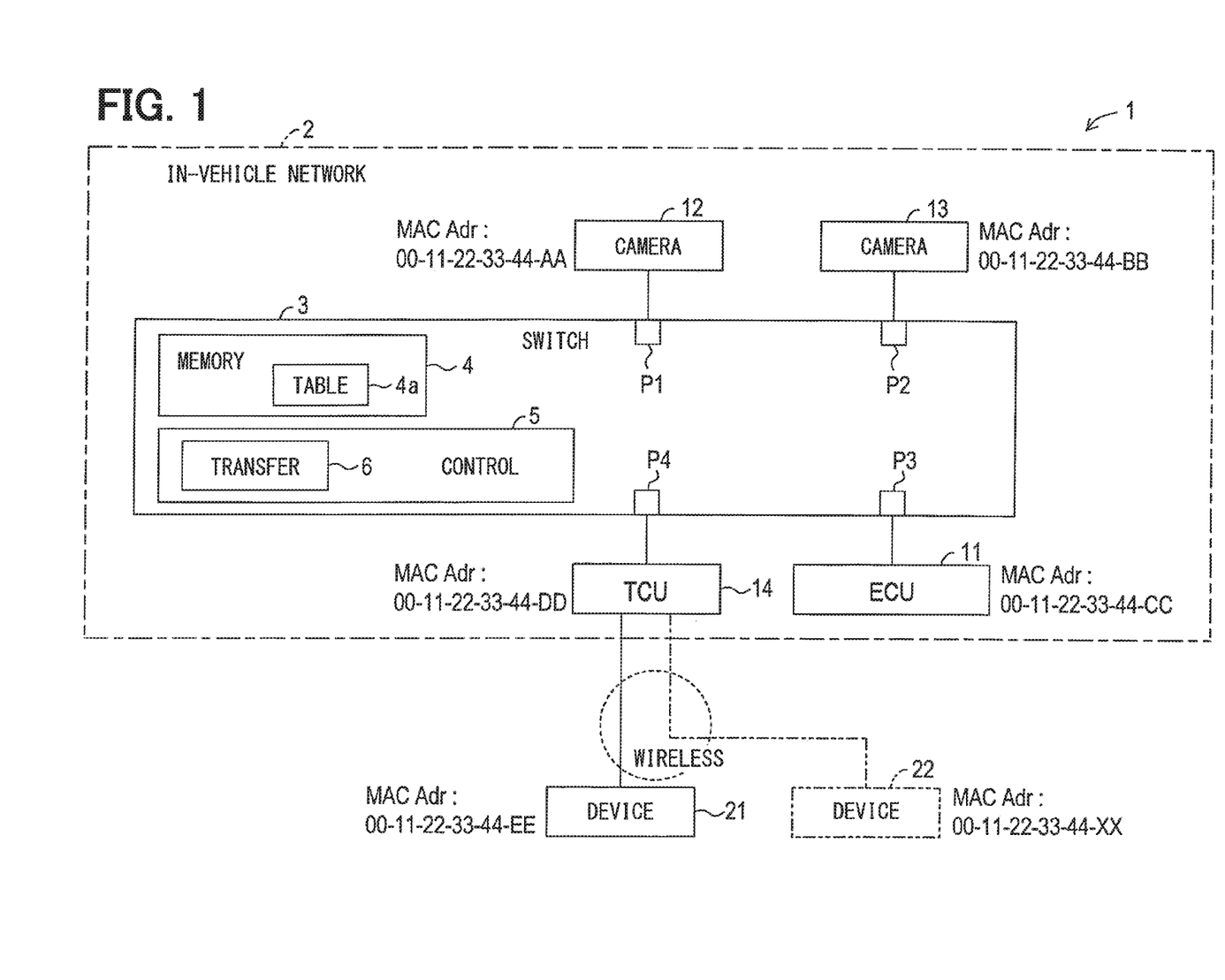
FIG. 1 is a block diagram showing a configuration of a switch and a communication network according to a first embodiment.

A communication network 1 according to a first embodiment shown in FIG. 1 is, for example, an Ethernet network mounted in a vehicle such as a passenger car. This communication network 1 includes a plurality of devices as nodes, some of which are external to the vehicle and communicate wirelessly. In FIG. 1, a portion described in a square frame of the one-dot chain line illustrates an in-vehicle network 2 mounted in a vehicle. Further, a device 21 and a device 22 illustrated outside the square frame of the one-dot chain line are outside the vehicle; the devices 21 and 22 communicate wirelessly with the in-vehicle network 2. In the present embodiment, either the device 21 or the device 22 communicates with a device as a node in the in-vehicle network 2.

The in-vehicle network 2 includes, as nodes, an electronic control unit (hereinafter, ECU) 11, camera units 12 and 13, and a telematics control unit (hereinafter, TCU) 14. Furthermore, the in-vehicle network 2 includes a switch 3 as a relay apparatus that relays communication between the nodes.

The TCU 14 wirelessly communicates with the device 21 or the device 22. The TCU 14 also has a function of connecting the device 21 or the device 22 to the in-vehicle network 2. That is, the device 21 or the device 22 communicates with the TCU 14 and can also communicate with each of the ECU 11 and the camera units 12 and 13 via the TCU 14.

The switch 3 performs communication for relay according to the Ethernet standard. The switch 3 is, for example, a layer 2 switch (i.e., L2 switch). The switch 3 includes a plurality of (for example, four) ports P1 to P4, a memory 4 as a storage storing a MAC address table 4a, and a controller 5 which controls the operation of the switch 3. The controller 5 is connected with the ports P1 to P4 and the memory 4 via an internal communication link in the switch 3. The controller 5, which may also be referred to as a control unit or control circuit, may be configured to include a microcomputer having a CPU and a memory, or an integrated circuit, or a combination thereof. Note that the controller 5 may be employed as not only one but also more controllers 5. Such one or more controllers 5 include several sections to achieve several functions. Each section may be also referred to as a module or circuit. An individual one of the sections (i.e., modules, circuits) in one or more controllers 5 or an individual one of the one or more controllers 5 may be configured to include (i) a hardware circuit including an analog and/or a digital circuit, (ii) a central processing unit (CPU) in a microcomputer along with memory storing instructions executed by the CPU, or (iii) both the hardware circuit and the CPU along with memory.

Among the ports P1 to P4 of the switch 3, the camera unit 12 is connected to the port P1; the camera unit 13 is connected to the port P2. The ECU 11 is connected to the port P3; the TCU 14 is connected to the port P4.

From the respective camera units 12 and 13, data representing images outside the vehicle captured by the respective cameras in the camera units 12 and 13 are transmitted to the ECU 11. The TCU 14 receives data wirelessly transmitted from the device 21 or 22 and transmits the received data to the ECU 11. The ECU 11 performs processing for controlling, for example, a power transmission source or a braking device of the vehicle based on data from the camera units 12 and 13 and the TCU 14. Further, the ECU 11 transmits data for requesting data or instructing an operation to any of the camera units 12 and 13, the TCU 14 and the devices 21 and 22.

In FIG. 1, "MACAdr" signifies a MAC address. Examples of the MAC addresses set to the ECU 11, the camera units 12, 13, the TCU 14, and the devices 21, 22 are individually described in FIG. 1. For example, the MAC address of the camera unit 12 is "00-11-22-33-44-AA"; the MAC address of the ECU 11 is "00-11-22-33-44 CC".

The MAC address table 4a records (i) the port number indicating a port of the ports P1 to P4 via which a frame is received and (ii) a transmission source MAC address included in the received frame for indicating a transmission source device (i.e., a device serving as a transmission source), such that the port number and the transmission source MAC address are associated with each other. The MAC address table 4a corresponds to an information table. Note that, in this disclosure, "information" may be not only uncountable but also countable. An information may be equivalent to an informational item or a data-item; thus, a plurality of informations may be equivalent to a plurality of informational items or a plurality of data-items. The transmission source MAC address corresponds to transmission source information (or a transmission source informational item) or a transmission source data-item. The port number corresponds to port information (or a port informational item) or a port data-item. The recording of the transmission source MAC address and the port number in the MAC address table 4a is realized by the MAC address learning function provided in the controller 5. Hereinafter, the transmission source MAC address recorded in the MAC address table 4a is also simply referred to as a MAC address.

Figure 2:
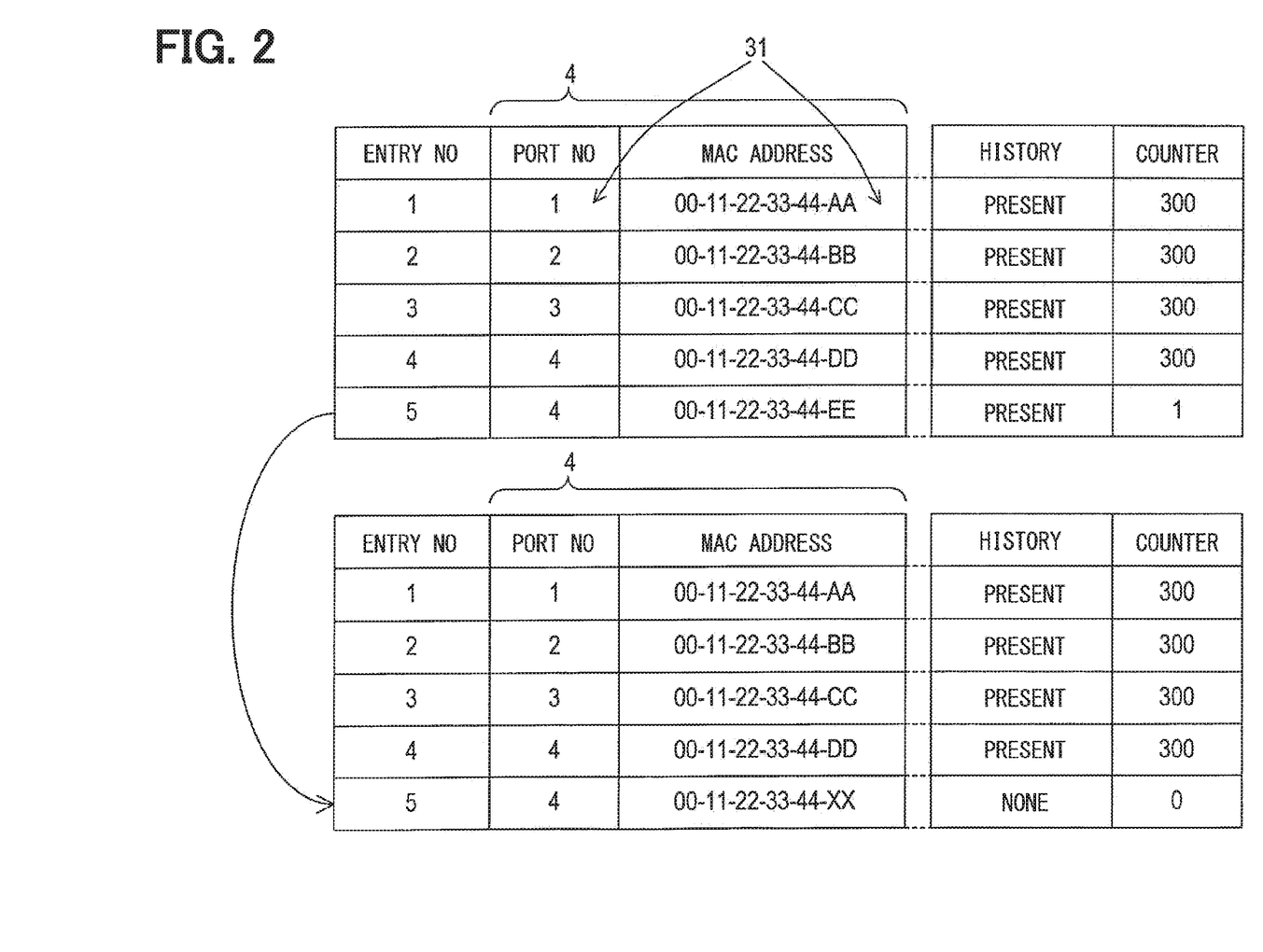
FIG. 2 is an explanatory diagram of a MAC address table, communication history information, and a counter value.

Further, in the MAC address table 4a, an area where one set including a MAC address and a port number is recorded is referred to as an entry as described above. In the MAC address table 4a shown in FIG. 2, the area or part denoted by reference numeral 31 is an entry. The entry corresponds to a recording area or a recording part. In FIG. 2, "entry number" is the number of the entry. In the present embodiment, the maximum number of entries is five, for example.

When, in FIG. 1, the device 21 among the devices 21 and 22 is connected to the port P4 of the switch 3 via the TCU 14, the contents recorded in the MAC address table 4a are, for example, as shown as the entry number 5 in the upper part of FIG. 2.

As shown in the upper part of FIG. 2, in the entry in which the port number (i.e., 1) of the port P1 is recorded, the MAC address of the camera unit 12 (i.e., 00-11-22-33-44-AA) is recorded as a transmission source MAC address (i.e., a MAC address as transmission source). In the entry in which the port number (i.e., 2) of the port P2 is recorded, the MAC address (i.e., 00-11-22-33-44-BB) of the camera unit 13 is recorded as a transmission source MAC address (i.e., a MAC address as transmission source). In the entry in which the port number (i.e., 3) of the port P3 is recorded, the MAC address (i.e., 00-11-22-33-44-CC) of the ECU 11 is recorded as a transmission source MAC address (i.e., a MAC address as transmission source).

Also, the TCU 14 and the device 21 are connected to the port P4; thus, two entries are provided for recording the port number (i.e., 4) of the port P4. The MAC address of the TCU 14 (i.e., 00-11-22-33-44-DD) is recorded as a transmission source MAC address in one of the two entries, whereas the MAC address of the device 21 (i.e., 00-11-22-33-44-EE) is recorded as a transmission source MAC address in the other one of the two entries.

In the present embodiment, the information is recorded earlier as the entry number is smaller. FIG. 2 illustrates an example of a correspondence between the entry numbers (i.e., the recording orders) and the port numbers.

The controller 5 of the switch 3 includes a transfer processor section 6 (which may be also referred to as a transfer processor module, a transfer processor circuit, or a transfer processor) that transfers (that is, relays) a frame between the ports P1 to P4. Note that, the controller 5 further includes other different sections such as a specification section, an update section, and an increase and decrease section, which will be described later. As described above, one or more controllers 5 may be provided; the transfer processor section may be included in a controller 5 different from another controller 5 including the other different sections. When a frame is received via any one of the ports P1 to P4, the transfer processor section 6 searches the MAC address table 4a for a search target entry which is an entry which records the same MAC address as the transmission destination MAC address included in the received frame. The transmission destination MAC address is a MAC address of a transmission destination device (i.e., a device as a transmission destination) of a frame, and corresponds to transmission destination information (or a transmission destination informational item) or a transmission destination data-item.

When the search target entry is present or found in the MAC address table 4a, the transfer processor section 6 determines, as a transfer destination port, the port having the port number recorded in the entry, and transmits the received frame via the transfer destination port. This frame transfer operation in this case is called filtering.

When the search target entry is not present in the MAC address table 4a, the transfer processor section 6 determines, as a transfer destination port, all ports other than the port via which the frame is received, and transmits the received frame via a plurality of transfer destination ports that are all ports other than the port via which the frame is received. This frame transfer operation in this case is called flooding.

Further, as shown in FIG. 2, in the MAC address table 4a in the switch 3, the communication history information and the counter value are provided or attached for each entry. The communication history information is information indicating whether or not to receive either a first target frame or a second target frame including the MAC address (hereinafter, recorded MAC address) recorded in the corresponding entry.

The first target frame is a frame that includes the same transmission source MAC address (i.e., the same MAC address serving as a transmission source) as the MAC address that is recorded. The second target frame is a frame including the same transmission destination MAC address (i.e., the same MAC address serving as a transmission destination) as the MAC address that is recorded.

Then, the communication history information is set to either "present" or "none". The communication history information being set to "present" indicates that either the first target frame or the second target frame has been received. In contrast, the communication history information being set to "none" indicates that neither the first target frame nor the second target frame has been received.

The counter value is an index value for the switch 3 to determine the communication frequency with which the device of the MAC address recorded in the corresponding entry has communicated via the switch 3. The communication frequency may also be referred to as the number of times the communications are made via the switch 3. The counter value corresponding to each entry is increased or decreased (i.e., incremented or decremented) by a process described later performed by the controller 5.

1-2. Processing

Figure 3:
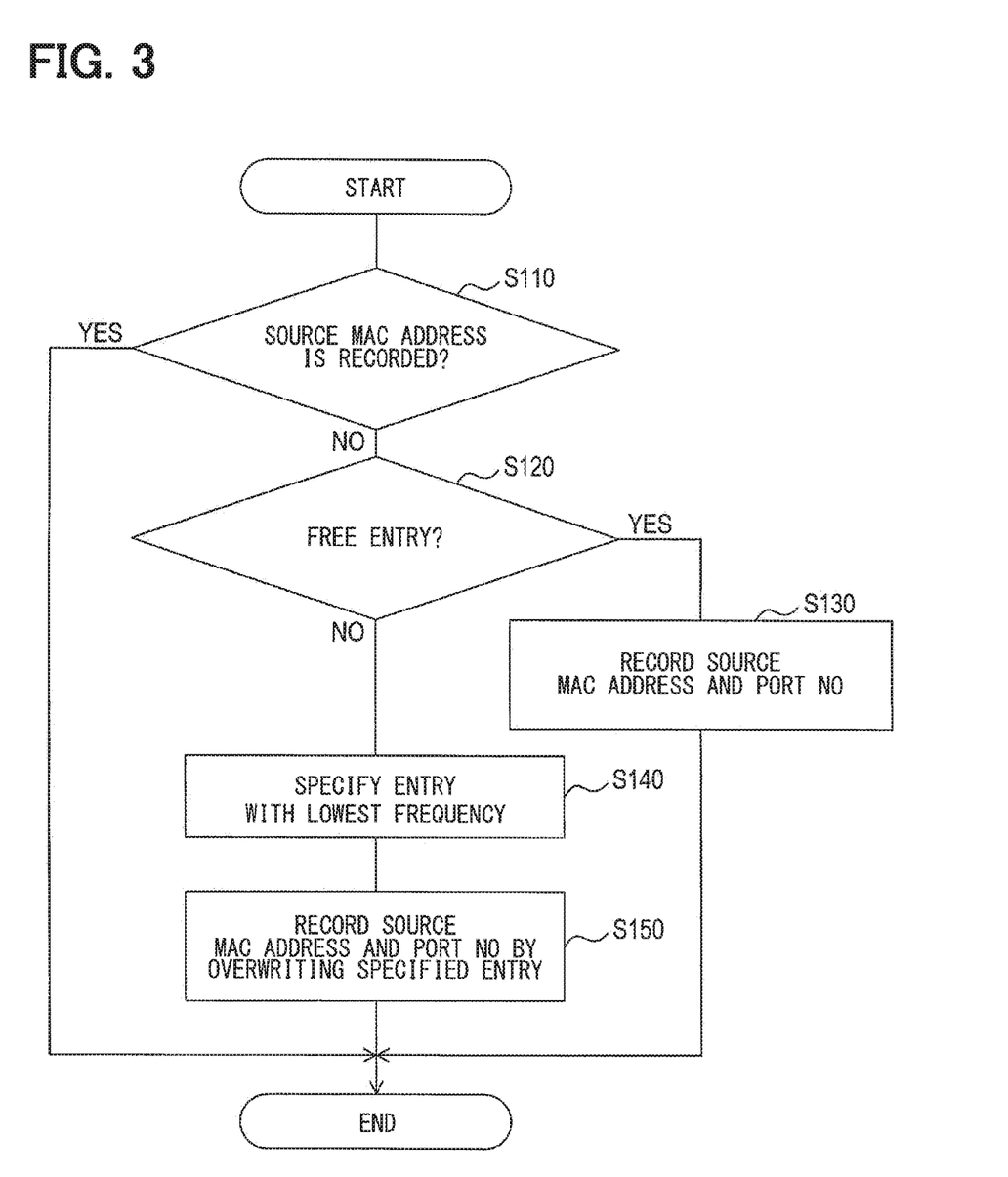
FIG. 3 is a flowchart illustrating a first process according to the first embodiment.
Figure 4:
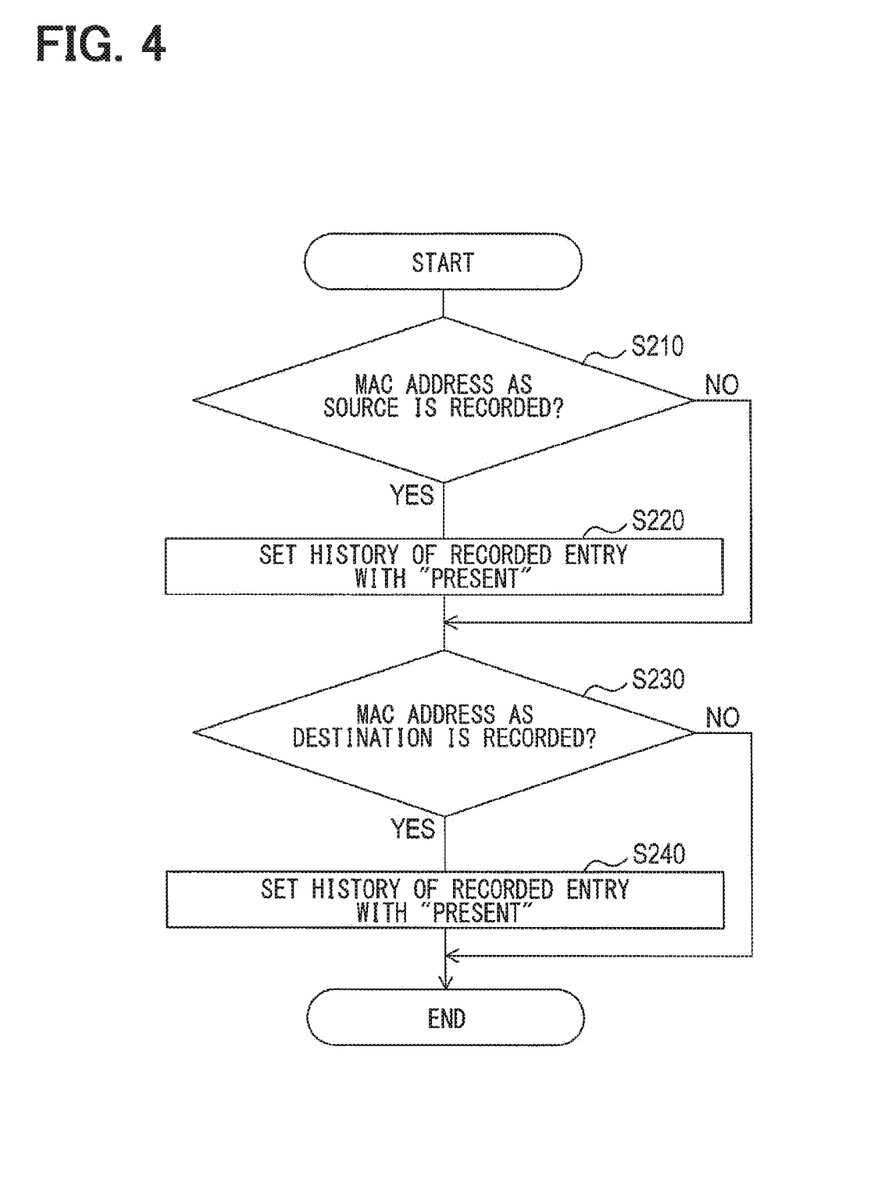
FIG. 4 is a flowchart illustrating a second process according to the first embodiment.
Figure 5:
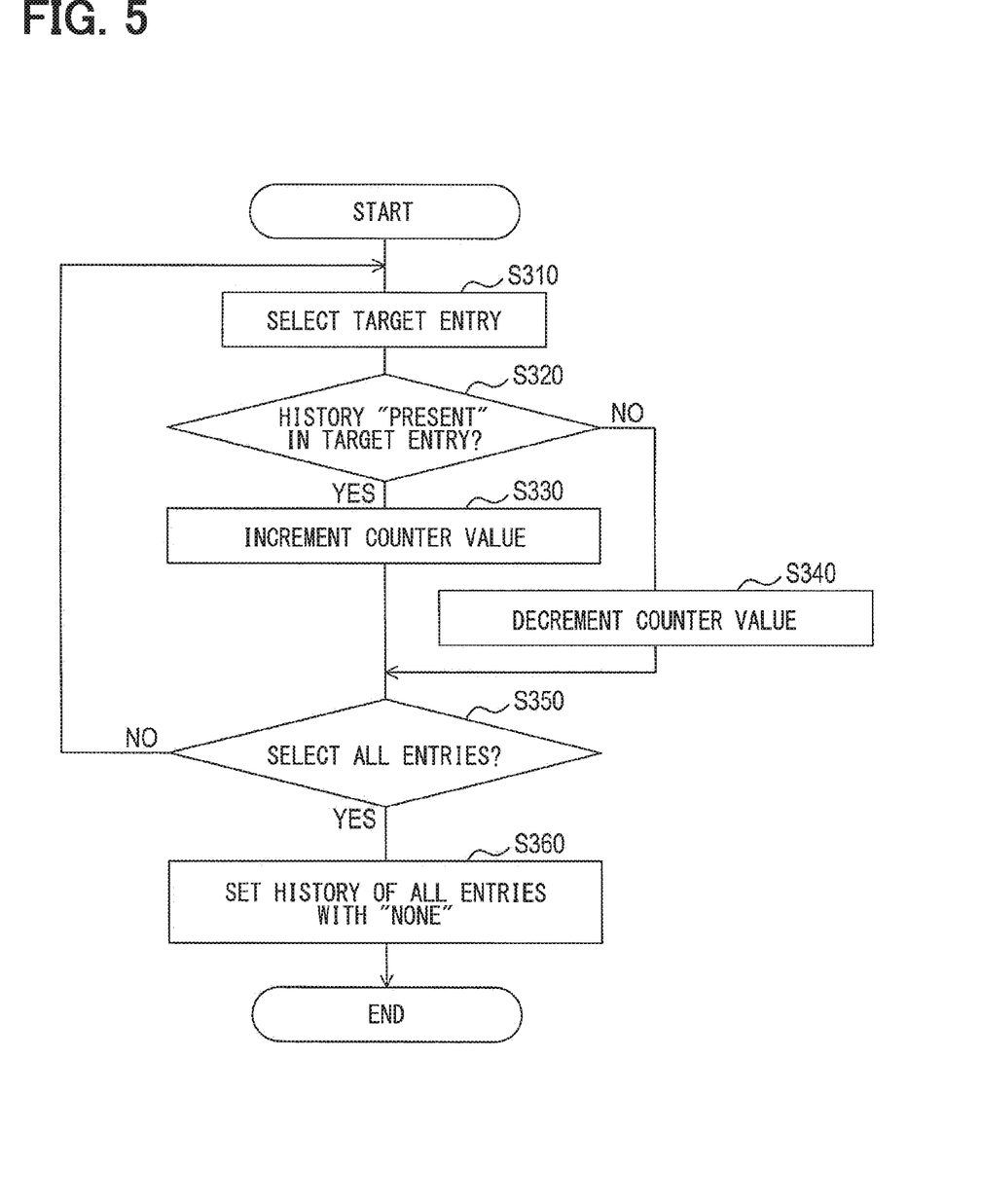
FIG. 5 is a flowchart illustrating a third process according to the first embodiment.

Next, first to third processes performed by the controller 5 of the switch 3 regarding recording of information in the MAC address table 4a will be described using the flowcharts of FIGS. 3 to 5. Note that as described above, the controller 5, which may be provided as one or more controllers 5 including sections to achieve the respective functions. Such sections, which are included in the following flowcharts in FIGS. 3 to 7, are represented, for instance, as S110 in FIG. 3. Each of the sections may be combined with another section or be further divided into several sections. As described above, the section may also be referred to as not only a module or circuit but also as a step in the flowcharts.

1-2-1. First Process

When a frame is received via any one of the ports P1 to P4, the controller 5 performs a first process in FIG. 3.

As shown in FIG. 3, when the first process is started, the controller 5 determines in S110 whether the transmission source MAC address (i.e., the MAC address serving as a transmission source) included in the received frame is recorded in the MAC address table 4a or not. If the transmission source MAC address is recorded, the first process is ended.

When the controller 5 determines that the transmission source MAC address in the received frame is not recorded in the MAC address table 4a in S110, the process proceeds to S120. In S120, the controller 5 determines whether or not there is a free space (vacancy) in the MAC address table 4a. That is, the controller 5 determines whether or not there is an entry (that is, a free entry) in which information is not recorded among all of the five entries that can be held by the MAC address table 4a.

If the controller 5 determines that the MAC address table 4a has a free entry (or free entries) in S120, the process proceeds to S130. The transmission source MAC address in the received frame and the port number of the port via which the frame is received are recorded in one free entry. After that, the controller 5 ends the first process. S130 is processing of the MAC address learning function.

When the controller 5 determines that there is no vacancy or free space in the MAC address table 4a in S120, that is, when the MAC address table 4a is full, the process proceeds to S140. In S140, the controller 5 specifies an entry with the lowest communication frequency among all the entries in the MAC address table 4a. The "the entry with the lowest communication frequency" referred to here is an entry which records the transmission source MAC address of the device that has the lowest frequency of communication via the switch 3 among the devices of which the transmission source MAC addresses recorded in all the entries. Note that how the entry with the lowest communication frequency is specified will be described later in [1-2-4].

In next S150, the controller 5 overwrites the entry specified in S140 and records the transmission source MAC address in the received frame and the port number of the port via which the frame is received. Further, in S150, the controller 5 sets the communication history information to "none" among the communication history information and the counter value corresponding to the overwritten entry, and sets the counter value to 0 as an initial value. After that, the controller 5 ends the first process.

1-2-2. Second Process

When a frame is received via any one of the ports P1 to P4, the controller 5 also performs a second process in FIG. 4.

As shown in FIG. 4, when the second process is started, the controller 5 determines in S210 whether the transmission source MAC address (i.e., the MAC address as a transmission source) in the received frame is recorded in the MAC address table 4a or not. If the transmission source MAC address is recorded, the process proceeds to S220.

In S220, the controller 5 sets, to "present", the communication history information corresponding to the entry which records the transmission source MAC address in the received frame among the plurality of entries in the MAC address table 4a. The process then proceeds to S230. Note that the communication history information for each entry is set to "none" in S360 of FIG. 5 described later.

When the controller 5 determines that the transmission source MAC address in the received frame is not recorded in the MAC address table 4a in S210, the process proceeds to S230 as it is.

In S230, the controller 5 determines whether the transmission destination MAC address (i.e., the MAC address as a transmission destination) in the received frame is recorded in the MAC address table 4a. When the transmission destination MAC address is recorded, the process proceeds to S240.

In S240, the controller 5 sets, to "present", the communication history information corresponding to the entry which records the transmission destination MAC address in the received frame among the plurality of entries in the MAC address table 4a. The second process is then ended.

When the controller 5 determines that the transmission destination MAC address in the received frame is not recorded in the MAC address table 4a in S230, the controller 5 ends the second process.

1-2-3. Third Process

The controller 5 performs a third process of FIG. 5 for every predetermined time interval. As shown in FIG. 5, when the third process is started, in S310, the controller 5 selects, as a target entry, one of the plurality of entries in the MAC address table 4a that has not been selected in the current processing cycle of the third process.

In next S320, the controller 5 determines whether the communication history information corresponding to the target entry is set to "present". When it is set to "present", the process proceeds to S330, and the counter value corresponding to the target entry is incremented. That is, the counter value corresponding to the target entry is increased by 1 as a predetermined first value. Thereafter, the controller 5 proceeds to S350.

Further, when the controller 5 determines that the communication history information corresponding to the target entry is set to "none" (i.e., not set to "present") in S320, the process proceeds to S340, where the counter value corresponding to the target entry is decremented. That is, the counter value corresponding to the target entry is decremented by 1 as a predetermined second value. Thereafter, the controller 5 proceeds to S350.

In S350, the controller 5 determines whether all the entries have been selected as target entries in S310. When all the entries have not been selected as target entries, the process returns to S310.

When it is determined in S350 that all the entries have been selected as the target entries, the process proceeds to S360. In S360, the controller 5 sets the communication history information corresponding to all the entries to "none". After that, the controller 5 ends the third process.

1-2-4. Specifying Entry with Lowest Frequency of Communication

In S140 of FIG. 3, the controller 5 specifies an entry having the smallest counter value among the plurality of entries as the entry with the lowest communication frequency. The entry with the lowest communication frequency corresponds to a target recording area or a target recording part.

1-2-5. Operation Contents of Controller According to Processing of FIGS. 3 to 5

The controller 5 performs the following operations according to the processing of FIGS. 4 and 5. The controller 5 determines whether either a first target frame or a second target frame, which includes the MAC address (that is, the recorded MAC address) recorded in each entry is received during the current predetermined time interval (i.e., a period of time) with respect to each of the entries. This operation is realized by the processing in FIG. 4, and S310, S320, S350, and S360 of FIG. 5. The determination that the communication history information is "present" in S320 of FIG. 5 corresponds to the determination that the first target frame or the second target frame has been received during a predetermined time interval. In addition, the determination that the communication history information is "none" in S320 of FIG. 5 corresponds to the determination that neither the first target frame nor the second target frame is received during the predetermined time interval.

Then, the controller 5 increments the counter value in S330 of FIG. 5 for the entry in which it is determined that the first target frame or the second target frame has been received during the predetermined time interval.

In addition, the controller 5 decrements the counter value in S340 of FIG. 5 for an entry in which it is determined that neither the first target frame nor the second target frame has been received during the predetermined time interval.

Furthermore, the controller 5 performs the following operation according to the process of FIG. 3. Under a state where the MAC address table 4a is full, the controller 5 may receive a frame including a transmission source MAC address not recorded in any of the plurality of entries (hereinafter, a transmission source unrecorded frame). In such a case, the entry with the smallest counter value is specified as the entry with the lowest communication frequency. Then, the transmission source MAC address included in the transmission source unrecorded frame and the port number of the port via which the frame is received are recorded by being written over the specified entry with the lowest communication frequency. This operation permits the update of the MAC address table 4a under the full state of the MAC address table 4a.

1-3. Operation Example

Suppose that the MAC address table 4a is configured as shown in the upper part of FIG. 2 by the MAC address learning function of the controller 5.

Then, suppose that a certain in-vehicle node which is one of the ECU 11, the camera units 12, 13 and the TCU 14 performs communication as a transmission source or a transmission destination once or more each time a predetermined time interval elapses. In such cases, the communication history information corresponding to the entry having the corresponding entry number 1 to 4 in which the MAC address of the certain in-vehicle node is recorded is set to "present". Then, the counter value corresponding to the entry having the corresponding entry number 1 to 4 increases.

For example, suppose that the communication from the camera unit 12 to the ECU 11 is performed once or more each time a predetermined time interval elapses. Then, the counter value of the entry recording the MAC address of the camera unit 12 serving as transmission source, and the counter value of the entry recording the MAC address of the ECU 11 serving as transmission destination are incremented each time the predetermined time interval elapses.

Similarly, suppose that the communication from the camera unit 13 to the ECU 11 is performed once or more each time the predetermined time interval elapses. Then, the counter value of the entry recording the MAC address of the camera unit 13 serving as transmission source, and the counter value of the entry recording the MAC address of the ECU 11 serving as transmission destination are incremented each time the predetermined time interval elapses.

In this example, the counter value of each of the entries having the entry numbers 1 to 4 is "300" as shown in FIG. 2. Further, the communication frequency between (i) the device 21 which is an external node outside the vehicle and (ii) the in-vehicle node is much lower than the communication frequency between the in-vehicle nodes. Therefore, the counter value of the entry having the entry number 5 in which the MAC address of the device 21 is recorded is set to "1" as shown in the upper part of FIG. 2.

In such a situation, suppose a case that the device 22 outside the vehicle whose MAC address is not recorded in the MAC address table 4a accesses the ECU 11, as indicated by the two-dot chain line in FIG. 1. That is, suppose that the device 22 transmits a frame whose transmission destination is the ECU 11.

When the frame from the device 22 is input to the port P4 of the switch 3 via the TCU 14, the MAC address table 4a is full, so the controller 5 determines "NO" in both S110 and S120 of FIG. 3.

Then, the controller 5 specifies an entry having the lowest communication frequency among the five entries in the MAC address table 4a in S140 of FIG. 3. In this example, the entry having the entry number 5 whose counter value is "1" is specified as the entry with the lowest communication frequency. Further, in S150 of FIG. 3, the controller 5 records (I) the MAC address of the device 22 serving as transmission source (i.e., 00-11-22-33-XX) and the port number of port P4 (i.e., 4) by overwriting the entry having the entry number 5, as shown in the lower part of FIG. 2. Further, the communication history information and the counter value of the entry having the entry number 5 are respectively initialized to "none" and "0".

1-4. Effects

According to the first embodiment detailed above, the following effects may be obtained.

(1a) According to the switch 3, when the frame from the device 22 of the MAC address not recorded in the MAC address table 4a is received while the MAC address table 4a is full, the transmission source MAC address in the frame and the port number of the port via which the frame is received are recorded by being written over any one of the entries. Therefore, when the switch 3 receives a frame addressed to the device 22 thereafter, the flooding is not performed. That is, according to the switch 3, the occurrence of flooding can be suppressed by updating the MAC address table 4a in the full state without performing aging for erasing the recorded content of the entry with the passage of time. For this reason, the switch 3 does not have an aging function.

Moreover, the entry to be overwritten is the entry with the lowest communication frequency (i.e., the entry recording the transmission source MAC address indicating the device with the lowest frequency of communication via the switch 3.) This configuration can decrease the possibility of erasing, from the MAC address table 4a, the transmission source MAC address of the device that is likely to be directly or indirectly connected to the switch 3 (i.e., the transmission source MAC address of the device that is likely to be a transmission destination). Therefore, this can also suppress the occurrence of flooding.

(1b) The controller 5 increases or decreases the counter value, which is an index value for specifying the entry with the lowest communication frequency, for each entry, by the operation described in the above [1-2-5]. Then, the entry with the smallest counter value is specified as the entry with the lowest communication frequency. Therefore, the entry with the lowest communication frequency, that is, the entry to be overwritten can be appropriately selected.

(1c) Since the transmission source data-item and the transmission destination data-item are MAC addresses, they can be applied to an Ethernet network. In the above embodiment, the controller 5 functions as each of a specification section (module or circuit) and an update section (module or circuit). Further, S110, S120, S140 of FIG. 3, S210 to S240 of FIG. 4, S310 to S360 of FIG. 5 correspond to the process as a specification section (module or circuit), and S150 of FIG. 3 corresponds to the process as an update section (module or circuit). Further, S210 to S240 in FIG. 4 and S310 to S360 in FIG. 5 correspond to the process as an increase and decrease section (module or circuit) in the specification section (module or circuit).

2. Second Embodiment

2-1. Main Difference from First Embodiment

Since the basic configuration of a second embodiment is similar to the first embodiment, the main difference will be described below. Note that the same reference signs as those in the first embodiment indicate the same configuration, and refer to the preceding descriptions.

Figure 6:
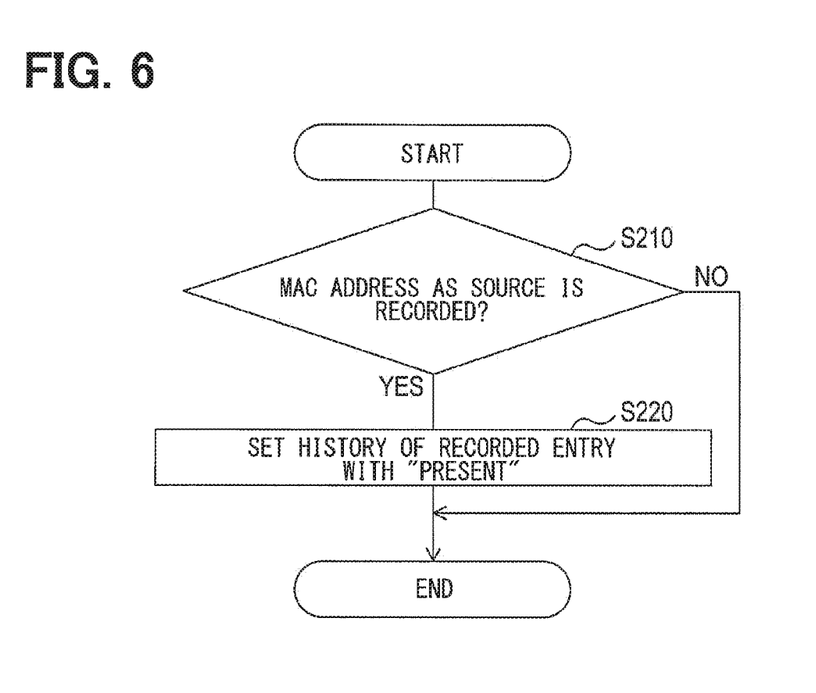
FIG. 6 is a flowchart illustrating a second process according to a second embodiment.

The switch 3 of the second embodiment is different from the switch 3 of the first embodiment in that the controller 5 performs the second process of FIG. 6 instead of the second process of FIG. 4. The second process of FIG. 6 is a process in which S230 and S240 are deleted from the second process of FIG. 4.

For this reason, the controller 5 of the second embodiment performs the following operation according to the processes of FIGS. 5 and 6. The controller 5 determines, with respect to each of the entries, whether or not a target frame including the MAC address as transmission source (i.e., the transmission source MAC address) identical to the MAC address recorded in the entry is received each time a predetermined time interval elapses. The target frame referred to here is the first target frame described above. That is, in the second embodiment, the determination that the communication history information is "present" (YES in S320 of FIG. 5) corresponds to the determination that the first target frame is received during the predetermined time interval. In addition, the determination that the communication history information is "none" (NO in S320 of FIG. 5) corresponds to the determination that the first target frame has not been received during the predetermined time interval. Then, the controller 5 increments the counter value in S330 of FIG. 5 for the entry in which it is determined that the first target frame has been received during the predetermined time interval. Further, the controller 5 decrements the counter value in S340 of FIG. 5 for the entry in which it is determined that the first target frame has not been received during the predetermined time interval.

2-2. Effects

Also in the second embodiment, the same effects as the effects of the first embodiment described above can be obtained.

In the second embodiment, S210 and S220 in FIG. 6 and S310 to S360 in FIG. 5 correspond to the process of an increase and decrease section (module or circuit).

3. Third Embodiment

3-1. Main Difference from First Embodiment

Since the basic configuration of a third embodiment is similar to the first embodiment, the main difference will be described below. Note that the same reference signs as those in the first embodiment indicate the same configuration, and refer to the preceding descriptions.

Figure 7:
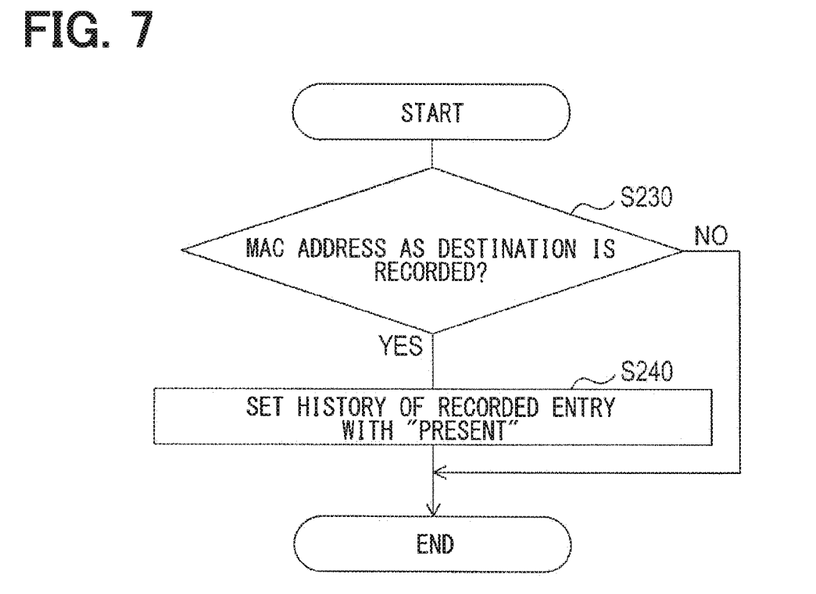
FIG. 7 is a flowchart showing a second process according to a third embodiment.

The switch 3 of the third embodiment is different from the switch 3 of the first embodiment in that the controller 5 performs the second process of FIG. 7 instead of the second process of FIG. 4. The second process of FIG. 6 is a process in which S210 and S220 are deleted from the second process of FIG. 4.

For this reason, the controller 5 of the third embodiment performs the following operation by the processing of FIGS. 5 and 7. The controller 5 determines, for each entry, whether or not a target frame including the MAC address as a transmission destination (i.e., the transmission destination MAC address) identical to the MAC address recorded in the entry is received each time a predetermined time interval elapses. The target frame referred to here is the second target frame described above. That is, in the third embodiment, the determination that the communication history information is "present" (YES in S320 of FIG. 5) corresponds to the determination that the second target frame has been received during the predetermined time interval. In addition, the determination that the communication history information is "none" (NO in S320 of FIG. 5) corresponds to the determination that the second target frame has not been received during the predetermined time interval. Then, the control unit 5 increments the counter value in S330 of FIG. 5 for the entry determined that the second target frame has been received during the predetermined time period. Further, the controller 5 decrements the counter value in S340 of FIG. 5 for the entry in which it is determined that the second target frame has not been received during the predetermined time interval.

3-2. Effects

The third embodiment also achieves the same effects as the effects of the first embodiment described above.

In the third embodiment, S230 and S240 in FIG. 7 and S310 to S360 in FIG. 5 correspond to processing as an increase and decrease section (module or circuit).

4. Other Embodiments

While the embodiments of the present disclosure have been described above, the present disclosure is not limited to the embodiments described above and can be carried out with various modifications.

For example, the predetermined first value for increasing the counter value in S330 of FIG. 5 is not limited to 1 and may be another positive value. Similarly, the predetermined second value for decreasing the counter value in S340 of FIG. 5 is not limited to 1 and may be another positive value. Further, the predetermined first value and the predetermined second value may be positive values different from each other. Also, for example, as a communication protocol, any protocol may be used as long as it includes transmission source data-item and transmission destination data-item in a frame, and may be a protocol other than Ethernet. A plurality of functions of one element in the above embodiments may be implemented by a plurality of elements, or one function of one element may be implemented by a plurality of elements. Alternatively, a plurality of functions including a plurality of elements may be realized by one element, or a function realized by a plurality of elements may be realized by one element. Alternatively, a part of the configuration of each of the above embodiments may be omitted. At least a part of the configuration of each of the above embodiments may be added to or replaced with another configuration of another embodiment.

In addition to the switch 3 described above, the present disclosure can also be realized in various forms, such as a communication system having the switch 3 as an element, a program for causing a computer to function as the switch 3, a non-transitory tangible storage medium such as a semiconductor memory storing the program, a method for updating an information table for a relay apparatus, or the like.

For reference to further explain features of the present disclosure, the description is added as follows. For example, in a related art, a switch as a relay apparatus in Ethernet has a MAC address learning function. Ethernet is a registered trademark. The MAC address learning function is a function that stores or records, in the MAC address table, (i) the transmission source MAC address in a frame received via any one of a plurality of ports in a switch and (ii) the port number of the port via which the frame is received, such that the transmission source MAC address is associated with the port number. Hereinafter, in the MAC address table, a portion or an area which records a single set including (i) the transmission source MAC address and (ii) the port number is called an entry.

When a frame is received via any one of a plurality of ports, a transfer destination port via which the received frame is transmitted is determined from the transmission destination MAC address in the received frame and the recorded contents in the MAC address table. In specific, if the MAC address table does not include the entry recording the same MAC address of transmission source as the MAC address of transmission destination included in the received frame, the received frame is subjected to flooding. That is, the received frame is transmitted via all ports other than the port via which the frame was received.

Further, some switches have an aging function with respect to the MAC address table. The term "aging" as used herein refers to erasing the entry if a frame including the transmission source MAC address recorded in the entries of the MAC address table is not received for a predetermined period of time (time interval) or more. Erasing an entry corresponds to erasing the recorded content of the entry.

As a result of detailed examination by the inventor, the following issues have been found. First an unregistered device is defined as a device of a transmission source MAC address not recorded in the MAC address table. When such an unregistered device transmits a frame and the frame is received by the switch while the MAC address table is full. In this case, the transmission source MAC address of the unregistered device cannot be recorded in the MAC address table. Therefore, when receiving a frame addressed to the unregistered device thereafter, the switch performs flooding. Flooding affects the bandwidth of the entire network.

In particular, in an in-vehicle communication system mounted in a vehicle, the devices connected to the network are generally fixed and the number of the devices is relatively small; thus, the maximum number of entries in the MAC address table is designed to be relatively small. For this reason, the in-vehicle communication system has a tendency to undergo the flooding under the state where the MAC address table is full.

In addition, even if the switch has an aging function, the transmission source MAC address of the unregistered device is not recorded in the MAC address table until the MAC address table has a free entry (i.e., vacant entry) by aging. Therefore, the aging has no effect of suppressing the occurrence of flooding under the state where the MAC address table is full.

Moreover, in the aging, there is a high possibility that the transmission source MAC addresses of one or more devices are unnecessarily erased from the MAC address table. This further increases the possibility of flooding.

It is thus desired to provide a relay apparatus capable of reducing the possibility of occurrence of flooding.

An aspect of the present disclosure described herein is set forth in the following clauses.

According to an aspect of the present disclosure, a relay apparatus may be provided to include a plurality of ports, a storage, and a transfer processor section (which may be also referred to as a transfer processor). The plurality of ports are configured to receive and transmit frames. The storage stores an information table including a plurality of recording areas. Herein an individual one of the plurality of recording areas is configured to record (i) a port data-item indicating a port of the plurality of ports via which a frame is received and (ii) a transmission source data-item included in the frame and indicating a device as transmission source of the frame such that the port data-item and the transmission source data-item are associated with each other.

The transfer processor section is configured to determine, when a first frame including a first transmission destination data-item indicating a first device as transmission source is received via a first port of the plurality of ports, whether or not the information table includes a second recording area that records a second transmission source data-item indicating as transmission source a second device identical to the first device indicated by the first transmission destination data-item included in the first frame that is received. The transfer processor section is further configured (i) to transmit the first frame via the second port indicated by the second port data-item recorded in the second recording area in response to determining that the information table includes the second recording area, and (ii) to transmit the first frame via all the ports other than the first port via which the first frame is received in response to determining that the information table does not include the second recording area.

The relay apparatus further may include a specification section (which may be also referred to as a specification module or circuit) and an update section (which may be also referred to as an update module or circuit). The specification section is configured to specify a target recording area being a recording area which records a third transmission source data-item included in a third frame and indicating as transmission source a third device having a lowest frequency of communication via the relay apparatus, in response to receiving a fourth frame via a fourth port of the plurality of ports under a fully recorded state of the plurality of recording areas. The fourth frame serves as a transmission source unrecorded frame being a frame including a fourth transmission source data-item that is not recorded in any of the plurality of recording areas. The fully recorded state of the plurality of recording areas is a state where the transmission source data-item and the port data-item are recorded fully in each of all the plurality of recording areas included in the information table.

The update section is configured to write, on the specified target recording area, (i) a fourth port data-item indicating the fourth port via which the fourth frame serving as the transmission source unrecorded frame is received and (ii) the fourth transmission source data-item included in the fourth frame.

As an optional feature of the above aspect, the transfer processor section, the specification section, and the update section may be included in one or more controllers connected with the ports and the storage. Furthermore, optionally, an individual one of the one or more controllers may be configured to include (i) a hardware circuit including an analog and/or a digital circuit, (ii) a central processing unit (CPU) in a microcomputer along with memory storing instructions executed by the CPU, or (iii) both the hardware circuit and the CPU along with memory.

Suppose a case where a frame (i.e., an unrecorded frame) from a certain device of the transmission source data-item not recorded in the information table is received under the state where the information table is full. Under such a case, the relay apparatus according to the aspect writes (i) the transmission source data-item of the certain device included in the frame and (ii) the port data-item of the port via which the frame is received, onto any one of the recording areas. Therefore, when the relay apparatus thereafter receives a frame whose transmission destination is the certain device, that is, a frame including the transmission destination data-item indicating the certain device, the flooding will not be performed. That is, according to the relay apparatus of the aspect, the occurrence of flooding can be suppressed by updating the information table in the full state without performing the aging, which erases the recorded contents of the recording area with the passage of time.

Moreover, among the plurality of recording areas, the recording area to be overwritten is a recording area that is specified as the transmission source data-item indicating the device with the lowest frequency of communication via the relay apparatus. This configuration can reduce the possibility of deleting the transmission source data-item of a device having the possibility of being directly or indirectly connected to the relay apparatus (i.e., the transmission source data-item of a device that is likely to be a transmission destination) from the information table. Therefore, this can also suppress the occurrence of flooding.

What is claimed is:

1. A relay apparatus comprising:
a plurality of ports configured to receive and transmit frames;
a storage storing an information table including a plurality of recording areas, wherein an individual one of the plurality of recording areas is configured to record (i) a port data-item indicating a port of the plurality of ports via which a frame is received and (ii) a transmission source data-item included in the frame and indicating a device as transmission source of the frame such that the port data-item and the transmission source data-item are associated with each other;
a transfer processor configured
to determine, when a first frame including a first transmission destination data-item indicating a first device as transmission source is received via a first port of the plurality of ports, whether or not the information table includes a second recording area that records a second transmission source data-item indicating as transmission source a second device identical to the first device indicated by the first transmission destination data-item included in the first frame that is received,
to transmit the first frame via the second port indicated by the second port data-item recorded in the second recording area in response to determining that the information table includes the second recording area, and
to transmit the first frame via all the ports other than the first port via which the first frame is received in response to determining that the information table does not include the second recording area;
a specification module configured to specify a target recording area being a recording area which records a third transmission source data-item included in a third frame and indicating as transmission source a third device having a lowest frequency of communication via the relay apparatus, in response to receiving a fourth frame via a fourth port of the plurality of ports under a fully recorded state of the plurality of recording areas,
the fourth frame serving as a transmission source unrecorded frame being a frame including a fourth transmission source data-item that is not recorded in any of the plurality of recording areas,
the fully recorded state of the plurality of recording areas being where the transmission source data-item and the port data-item are recorded fully in each of all the plurality of recording areas included in the information table; and
an update module configured to write, on the target recording area, (i) a fourth port data-item indicating the fourth port via which the fourth frame serving as the transmission source unrecorded frame is received and (ii) the fourth transmission source data-item included in the fourth frame.

2. The relay apparatus according to claim 1, wherein:
the specification module includes an increase and decrease module configured to increase and decrease a plurality of counter values respectively corresponding to the plurality of recording areas each time a predetermined time interval elapses;
the increase and decrease module is configured
to determine whether or not a target frame is received during the time interval,
the target frame being either a first target frame or a second target frame,
the first target frame including a transmission source data-item indicating as transmission source a first target device which is identical to a device as transmission source indicated by a transmission source data-item recorded in a one recording area of the plurality of recording areas,
the second target frame including a transmission destination data-item indicating as transmission destination a second target device which is identical to a device as transmission source indicated by a transmission source data-item recorded in the one recording area of the plurality of recording areas,
to increment by a predetermined first value a counter value corresponding to the one recording area in response to determining that the target frame is received during the time interval, and
to decrement by a predetermined second value a counter value corresponding to the one recording area in response to determining that the target frame is not received during the time interval; and
the specification module is configured to specify as the target recording area a recording area corresponding to a smallest counter value among the counter values corresponding to the plurality of recording areas.

3. The relay apparatus according to claim 1, wherein:
the specification module includes an increase and decrease module configured to increase and decrease a plurality of counter values respectively corresponding to the plurality of recording areas each time a predetermined time interval elapses;
the increase and decrease module is configured
to determine whether or not a target frame is received during the time interval, the target frame including a transmission source data-item indicating as transmission source a target device which is identical to a device as transmission source indicated by a transmission source data-item recorded in a one recording area of the plurality of recording areas,
to increment by a predetermined first value a counter value corresponding to the one recording area in response to determining that the target frame is received during the time interval, and
to decrement by a predetermined second value a counter value corresponding to the one recording area in response to determining that the target frame is not received during the time interval; and
the specification module is configured to specify as the target recording area a recording area corresponding to a smallest counter value among the counter values corresponding to the plurality of recording areas.

4. The relay apparatus according to claim 1, wherein:
the specification module includes an increase and decrease module configured to increase and decrease a plurality of counter values respectively corresponding to the plurality of recording areas each time a predetermined time interval elapses,
the increase and decrease module is configured
to determine whether or not a target frame is received during the time interval, the target frame including a transmission destination data-item indicating as transmission destination a target device which is identical to a device as transmission source indicated by a transmission source data-item recorded in a one recording area of the plurality of recording areas,
to increment by a predetermined first value a counter value corresponding to the one recording area in response to determining that the target frame is received during the time interval, and
to decrement by a predetermined second value a counter value corresponding to the one recording area in response to determining that the target framed is not received during the time interval; and
the specification module is configured to specify as the target recording area a recording area corresponding to a smallest counter value among the counter values corresponding to the plurality of recording areas.

5. The relay apparatus according to claim 1, wherein:
the relay apparatus is an Ethernet (registered trademark) relay apparatus; and
the transmission source data-item and the transmission destination data-item are MAC addresses.

6. A relay apparatus comprising:
a plurality of ports configured to receive and transmit frames;
a storage storing an information table including a plurality of recording areas, wherein an individual one of the plurality of recording areas is configured to record (i) a port data-item indicating a port of the plurality of ports via which a frame is received and (ii) a transmission source data-item included in the frame and indicating a device as transmission source of the frame such that the port data-item and the transmission source data-item are associated with each other; and
one or more controllers connected with the plurality of ports and the storage via a communication link, the one or more controllers being configured
to determine, when a first frame including a first transmission destination data-item indicating a first device as transmission source is received via a first port of the plurality of ports, whether or not the information table includes a second recording area that records a second transmission source data-item indicating as transmission source a second device identical to the first device indicated by the first transmission destination data-item included in the first frame that is received,
to transmit the first frame via the second port indicated by the second port data-item recorded in the second recording area in response to determining that the information table includes the second recording area, and
to transmit the first frame via all the ports other than the first port via which the first frame is received in response to determining that the information table does not include the second recording area,
the one or more controllers being further configured
to specify a target recording area being a recording area which records a third transmission source data-item included in a third frame and indicating as transmission source a third device having a lowest frequency of communication via the relay apparatus, in response to receiving a fourth frame via a fourth port of the plurality of ports under a fully recorded state of the plurality of recording areas, the fourth frame serving as a transmission source unrecorded frame being a frame including a fourth transmission source data-item that is not recorded in any of the plurality of recording areas, the fully recorded state of the plurality of recording areas being where the transmission source data-item and the port data-item are recorded fully in each of all the plurality of recording areas included in the information table, and to write, on the target recording area, (i) a fourth port data-item indicating the fourth port via which the fourth frame serving as the transmission source unrecorded frame is received and (ii) the fourth transmission source data-item included in the fourth frame.

* * * * *